(12) United States Patent
Maslany et al.

(10) Patent No.: US 11,078,954 B1
(45) Date of Patent: Aug. 3, 2021

(54) HUB BEARING UNIT WITH AXIAL DISPLACEMENT LIMITER

(71) Applicant: AKTIEBOLAGET SKF, Gothenburg (SE)

(72) Inventors: Nicholas J Maslany, Brighton, MI (US); Lokesh Nagarajan, Northville, MI (US); Eric D Phaneuf, Berkley, MI (US); David Christopher Rybski, White Lake, MI (US)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 16/742,798

(22) Filed: Jan. 14, 2020

(51) Int. Cl.
*F16C 19/18* (2006.01)
*B60B 27/00* (2006.01)
*F16C 33/58* (2006.01)
*F16C 39/02* (2006.01)

(52) U.S. Cl.
CPC ........ *F16C 19/186* (2013.01); *B60B 27/0005* (2013.01); *F16C 33/586* (2013.01); *F16C 39/02* (2013.01); *F16C 2326/02* (2013.01)

(58) Field of Classification Search
CPC ...... F16C 19/186; F16C 33/586; F16C 39/02; F16C 2326/02; B60B 27/0005; B60B 27/0094
USPC ...................................................... 384/513
See application file for complete search history.

(56) References Cited

U.S. PATENT DOCUMENTS

| 8,845,203 | B2 | 9/2014 | Meeker et al. | |
| 9,283,808 | B2 | 3/2016 | Meeker et al. | |
| 2010/0296759 | A1* | 11/2010 | Dlugai | H01F 1/113 384/448 |
| 2011/0135233 | A1* | 6/2011 | Sutherlin | F16C 39/02 384/513 |
| 2015/0267750 | A1* | 9/2015 | Ina | F16C 33/64 384/512 |

FOREIGN PATENT DOCUMENTS

DE 102017129960 A1 6/2019

* cited by examiner

*Primary Examiner* — James Pilkington
(74) *Attorney, Agent, or Firm* — J-TEK Law PLLC; Scott T. Wakeman; Mark A. Ussai

(57) ABSTRACT

A hub bearing unit includes an inner ring having inboard and outboard axial ends and a bearing inner race on an outer surface. An outer ring is disposed about the inner ring and has inboard and outboard axial ends and a bearing outer race on an inner surface. One ring is coupled with a wheel and is rotatable about an axis and the other ring is fixedly coupled with a vehicle. An annular displacement limiter extends radially outwardly from the inner ring and has a radial stop surface spaced axially from the inboard end of the outer ring. The stop surface engages with the outer ring end when one ring displaces axially relative to the other ring. Preferably, the limiter is integrally formed with an annular insert providing a bearing inner race, but may be separately formed and disposed about the insert or the inner ring outer surface.

19 Claims, 7 Drawing Sheets

HUB BEARING UNIT WITH AXIAL DISPLACEMENT LIMITER

BACKGROUND OF THE INVENTION

The present invention relates to bearings, and more particularly to wheel hub bearing units.

Wheel hub units are known and are typically provided to rotatably couple a wheel to a vehicle frame or powertrain. A wheel hub unit includes an inner ring, and outer ring and rolling elements disposed between the inner and outer rings, with the wheel being mounted to one ring and the other ring being connected with the frame through a shaft, a suspension assembly or a steering mechanism, or with the powertrain. When the wheel experiences an impact of a sufficient magnitude, the relative displacement between the ring coupled with the wheel and the other ring may cause the rolling elements to impact the races with a sufficient force to indent the race surfaces. Such indentations or "brinelling" can adversely affect operation of the bearings and may lead to premature wear and failure of the bearing races.

SUMMARY OF THE INVENTION

In one aspect, the present invention is a hub bearing unit for rotatably coupling a wheel with a vehicle frame or powertrain. The hub bearing unit comprises an inner ring having an inboard axial end, an outboard axial end, an outer circumferential surface and at least one bearing inner race disposed on the outer surface. An outer ring is disposed about the inner ring and has an inboard axial end, an outboard axial end, an inner circumferential surface and at least one bearing outer race disposed on the ring inner surface. One of the inner ring and the outer ring is coupled with the wheel so as to rotate about a central axis and the other one of the inner ring and the outer ring is coupled with the vehicle. A plurality of rolling elements are rollable upon the inner and outer races to rotatably couple the inner and outer rings. Further, a displacement limiter extends radially outwardly from the inner ring outer surface and has a radial stop surface spaced axially from the inboard axial end of the outer ring. The stop surface engages with the inboard axial end of the outer ring when one of the inner ring and the outer ring displaces axially relative to the other one of the inner ring and the outer ring.

In another aspect, the present invention is again a hub bearing unit for rotatably coupling a wheel with a vehicle frame or powertrain. The hub bearing unit comprises an inner ring having an inboard axial end, an outboard axial end, an outer circumferential surface and an annular groove extending radially inwardly from the outer surface. An annular insert is disposed within the inner ring groove and provides a bearing inner race. An outer ring is disposed about the inner ring and has an inboard axial end, an outboard axial end, an inner circumferential surface and at least one bearing outer race disposed on the ring inner surface. One of the inner ring and the outer ring is coupled with the wheel so as to rotate about a central axis and the other one of the inner ring and the outer ring is coupled with the vehicle. A plurality of rolling elements are rollable upon the inner and outer races to rotatably couple the inner and outer rings. Further, a displacement limiter extends radially outwardly from the annular insert and has a radial stop surface spaced axially from the inboard axial end of the outer ring. The stop surface engages with the inboard axial end of the outer ring when one of the inner ring and the outer ring displaces axially relative to the other one of the inner ring and the outer ring.

In yet another aspect, the present invention is a hub bearing unit as recited in the preceding paragraph and further in which the displacement limiter is integrally formed with the annular race insert.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
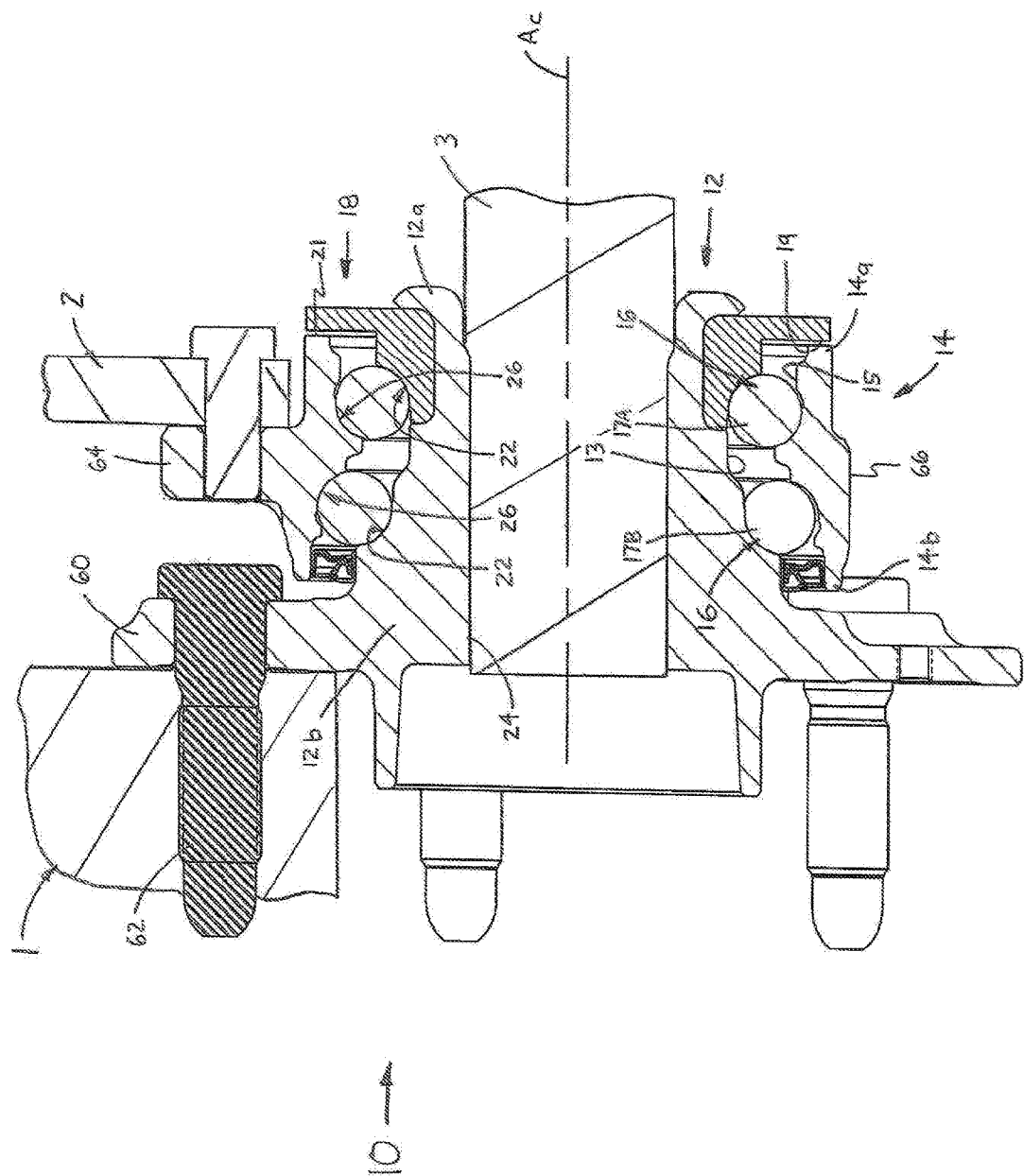
FIG. 1 is an axial cross-sectional view of a hub bearing unit with an axial displacement limiter integral with a race insert in accordance with the present invention.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-8 a hub bearing unit 10 for rotatably coupling a wheel 1 with a vehicle frame 2 (indicated in FIG. 1), preferably through a steering mechanism or a suspension, or with a powertrain (not shown). The hub bearing unit 10 basically comprises an inner ring 12, an outer ring 14 disposed about the inner ring 12, at least one plurality or "row" of rolling elements 16 disposed between the inner and outer rings 12, 14, respectively, and a displacement limiter 18 configured to limit relative axial displacement between the two rings 12, 14. More specifically, the inner ring 12 is generally cylindrical and has an inboard axial end 12a, an outboard axial end 12b, an outer circumferential surface 13 and at least one bearing inner race 22 disposed on the outer surface 13, and preferably has a central bore 24 configured to receive a shaft 3 (FIG. 1) coupled with the vehicle frame 2 or with a powertrain (not shown). The outer ring 14 is generally tubular and has an inboard axial end 14a, an outboard axial end 14b, an inner circumferential surface 15 and at least one bearing outer race 26 disposed on the ring inner surface 15.

As discussed in further detail below, one of the inner and outer rings 12, 14 is coupled with the wheel 1 so as to be rotatable about a central axis $A_C$ and the other one of the inner and outer rings 12, 14 is fixedly or "non-rotatably" coupled with the vehicle frame or with the powertrain. Further, the plurality of rolling elements 16 are rollable simultaneously upon the inner and outer races 22, 26 so as to rotatably couple the inner and outer rings 12, 14. Preferably, the rolling elements 16 are generally spherical balls, but may alternatively be cylindrical rollers, tapered rollers, needles or any other type of rolling element. Preferably, the inner ring 12 and the outer ring 14 are formed of a metallic material, such as high or medium carbon steels, and the rolling elements 16 are either formed of a metallic material, for example chromium steel, or a ceramic material such as aluminum oxide.

Further, the displacement limiter 18 is either formed as a single annular body 30 or as a plurality of arcuate segments 32, as described in detail below. With either construction, the limiter 18 extends radially from the inner ring outer surface 13 and has a radial stop surface 19 spaced axially from the inboard end 14a of the outer ring 14. The limiter 18 is configured such that the stop surface 19 engages with the inboard axial end 14a of the outer ring 14 when one of the inner ring 12 and the outer ring 14 displaces axially relative to the other one of the inner ring 12 and the outer ring 14. Thereby, the displacement limiter 18 functions to "limit" the total potential relative axial displacement between the two rings 12, 14, particularly during an impact event experienced by the wheel 1, so as to reduce or eliminate any potential impact damage to the bearing races 22, 26.

Figure 3:
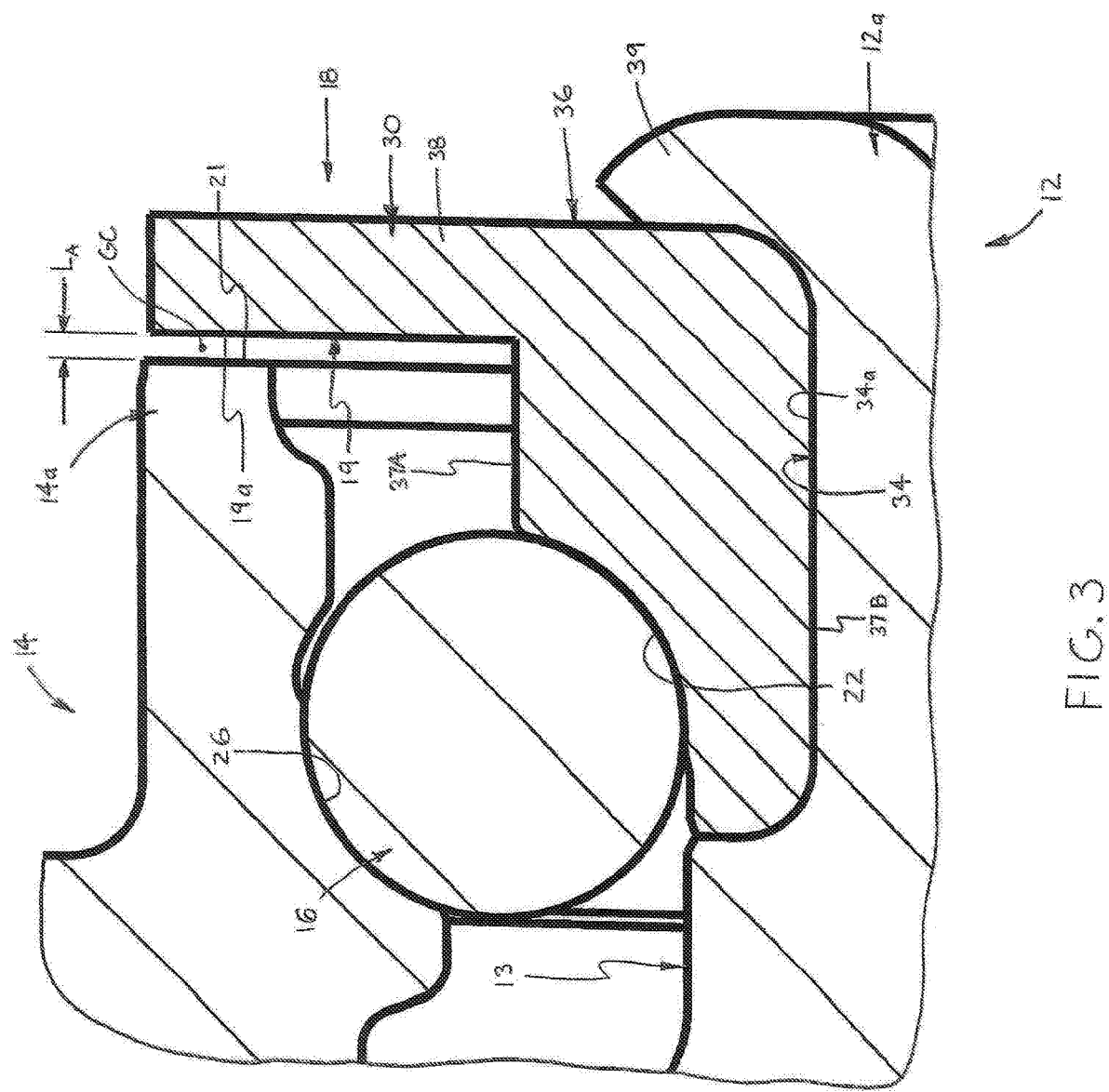
FIG. 3 is a more enlarged view of a portion of FIG. 2, showing the displacement limiter spaced axially from an inboard end of the outer ring.
Figure 4:
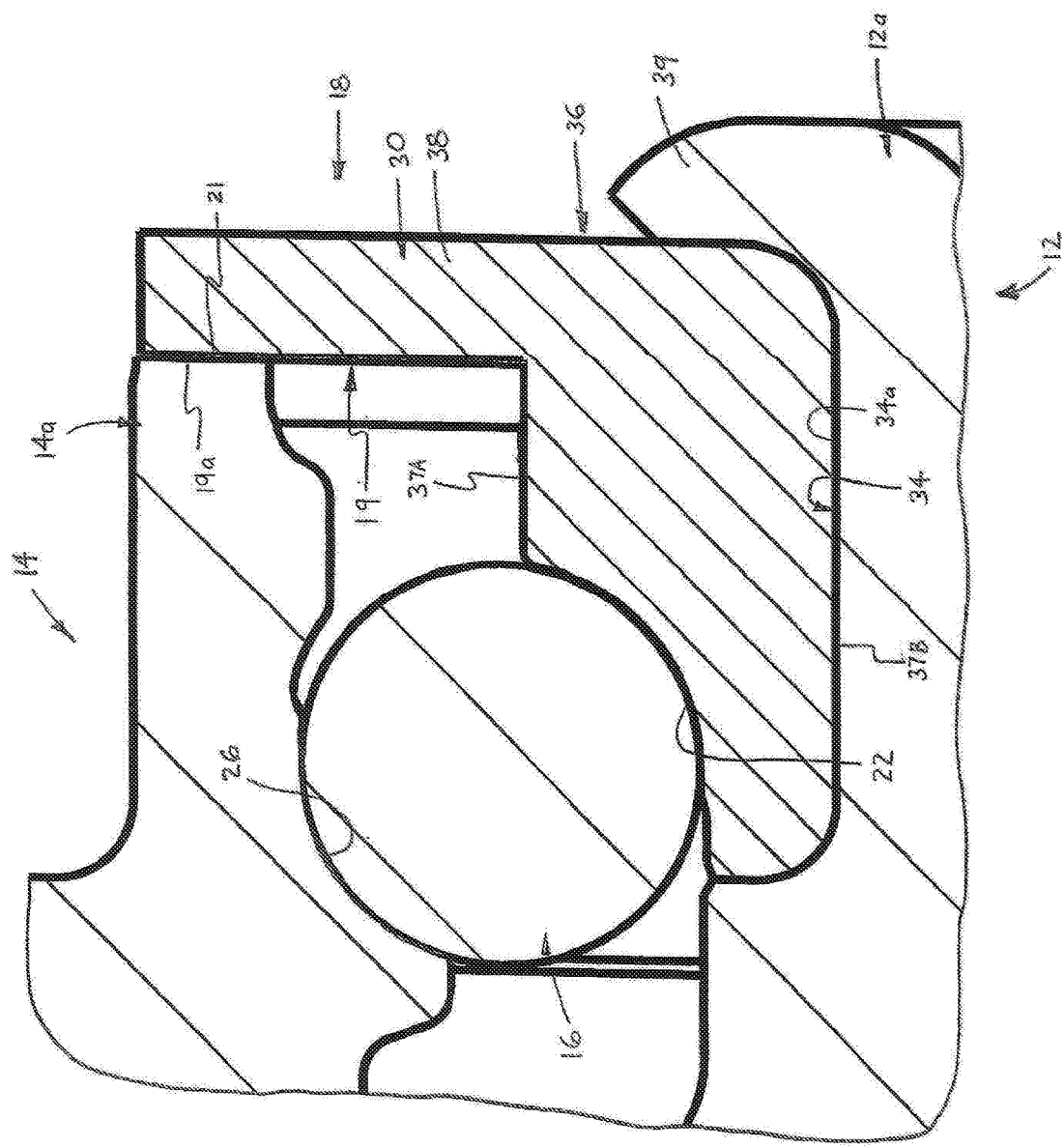
FIG. 4 is another view of the portion of the hub bearing unit of FIG. 3, showing the displacement limiter in contact with the inboard end of the outer ring.

As best shown in FIG. 3, an axial control gap GC is defined between the radial stop surface 19 of the displacement limiter 18 and the inboard axial end 14a of the outer ring 14, more specifically between the radially-outermost section 19a of the stop surface 19 and a radial end surface 21 of the outer ring 14. The control gap GC has a predetermined axial length $L_A$ selected to limit relative axial displacement between the inner and outer rings 12, 14, respectively, to the control gap axial length $L_A$. The control gap GC is sized such that, under normal vehicle operating conditions, the one ring 12 or 14 that is coupled with the wheel 1 is freely rotatable about the central axis $A_C$. However, when an impact event occurs (e.g., wheel 1 hitting a curb, a pothole, etc.), the resulting axial displacement of the wheel-coupled ring 12 or 14 relative to the other ring 14, 12 is prevented from exceeding the axial length $L_A$ of the control gap GC by the displacement limiter 18. As discussed above, excessive radial displacements of one ring 12 or 14 relative to the other ring 14, 12 may allow the rolling elements 16 to impact against the outer surfaces 22a, 26a of the races 22, 26 with sufficient force to indent the surfaces 22a, 26a, such indentations being referred to as "brinelling". Brinelling typically leads to excessive vibration or chattering of the rolling elements 16, and accelerates wear of the race surfaces 22a, 26a, leading to galling and/or spalling or the flaking off of bearing material.

Thus, by limiting relative axial displacement between the inner and outer rings 12, 14, respectively, the displacement limiter 18 functions as an "anti-brinelling" device. Preferably, the axial length $L_A$ of the control gap GC has a value of about 0.3 millimeters or less (i.e., no greater than about 0.3 mm), and may be within a range of between about 0.15 millimeters (or even 0.04 millimeters) and about 0.30 millimeters. Such values of the control gap axial length $L_A$ have been determined to prevent axial displacements of a magnitude that may cause brinelling impacts while still permitting free relative rotation between the two rings 12, 14 during normal vehicle operating conditions. Having described the basic components and functions above, these and other structural components of the hub bearing unit 10 are described in greater detail below.

Figure 7:
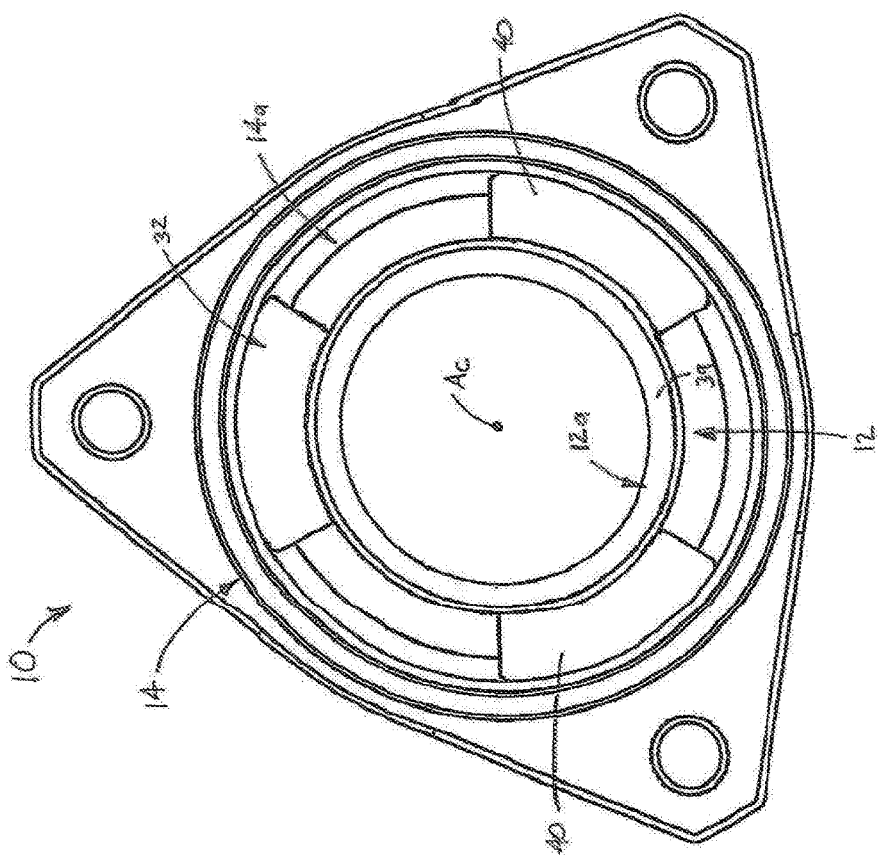
FIG. 7 is another end view of the hub bearing unit in accordance with the present invention, showing an alternative segmented construction of the displacement limiter.

Referring now to FIGS. 1-5 and 7, the inner ring 12 preferably includes an annular groove 34 formed in the ring outer circumferential surface 13 and an annular insert 36 disposed within the groove 34. The insert 36 has an outer circumferential surface 37A and the bearing inner race 22 is formed in the insert outer surface 37A, as described in further detail below. The displacement limiter 18 is spaced axially from the inner race 22 toward the ring inboard end 12a and is either integrally formed with the insert 36 (FIGS. 1-6), as preferred, or is disposed about the insert outer surface 37A (FIG. 7). Further, the insert 36 is preferably retained within the groove 34 by an integral lip 39 of the inner ring 12, formed on the inboard end 12a after the insert 36 is installed within the groove 34. Preferably, the displacement limiter 18 is formed as a continuous annular flange 38 extending radially outwardly from the insert outer surface 37A and circumferentially about the central axis $A_C$, as best shown in FIG. 6. Alternatively, the integral limiter 18 may be formed as a plurality of arcuate flange segments 40 extending radially outwardly from the insert outer surface 37A and spaced circumferentially about the central axis $A_C$, as depicted in FIG. 7.

Figure 5:
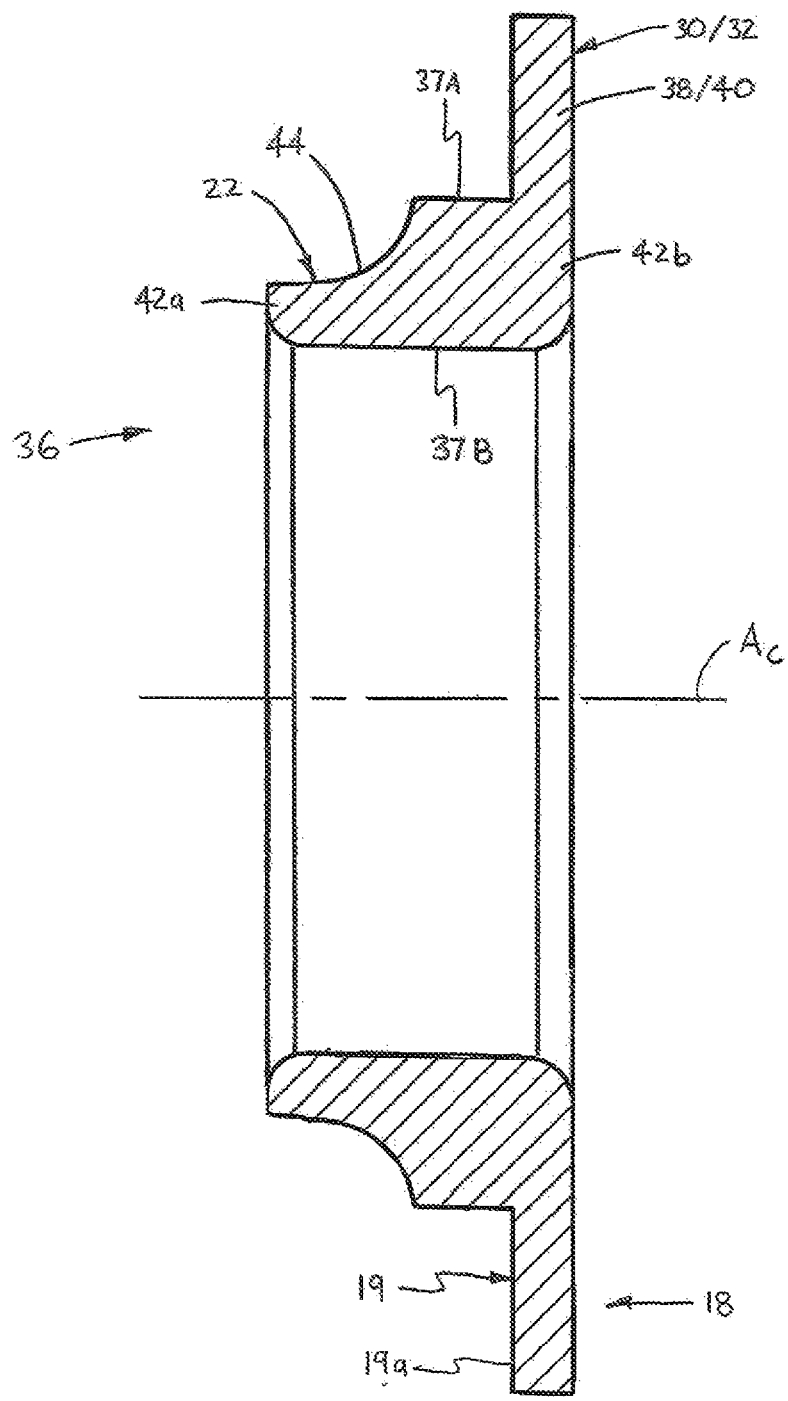
FIG. 5 is an axial cross-sectional view of an annular insert separate from the hub bearing unit, the insert providing a bearing inner race and an integral displacement limiter.
Figure 6:
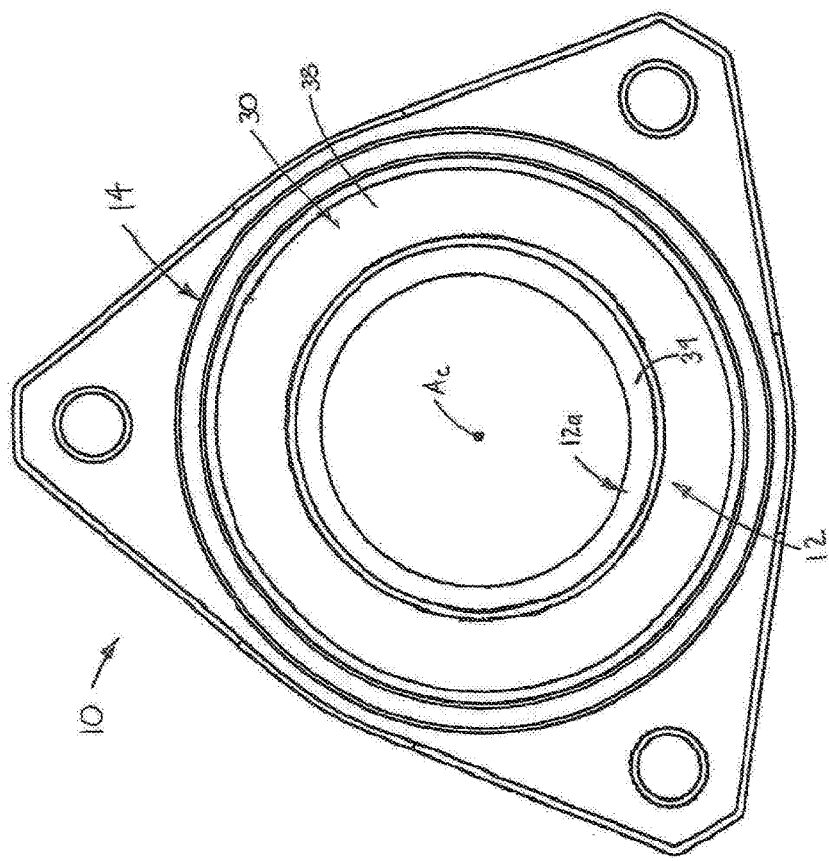
FIG. 6 is an end view of the hub bearing unit in accordance with the present invention, showing a preferred continuous annular construction of the displacement limiter.
Figure 8:
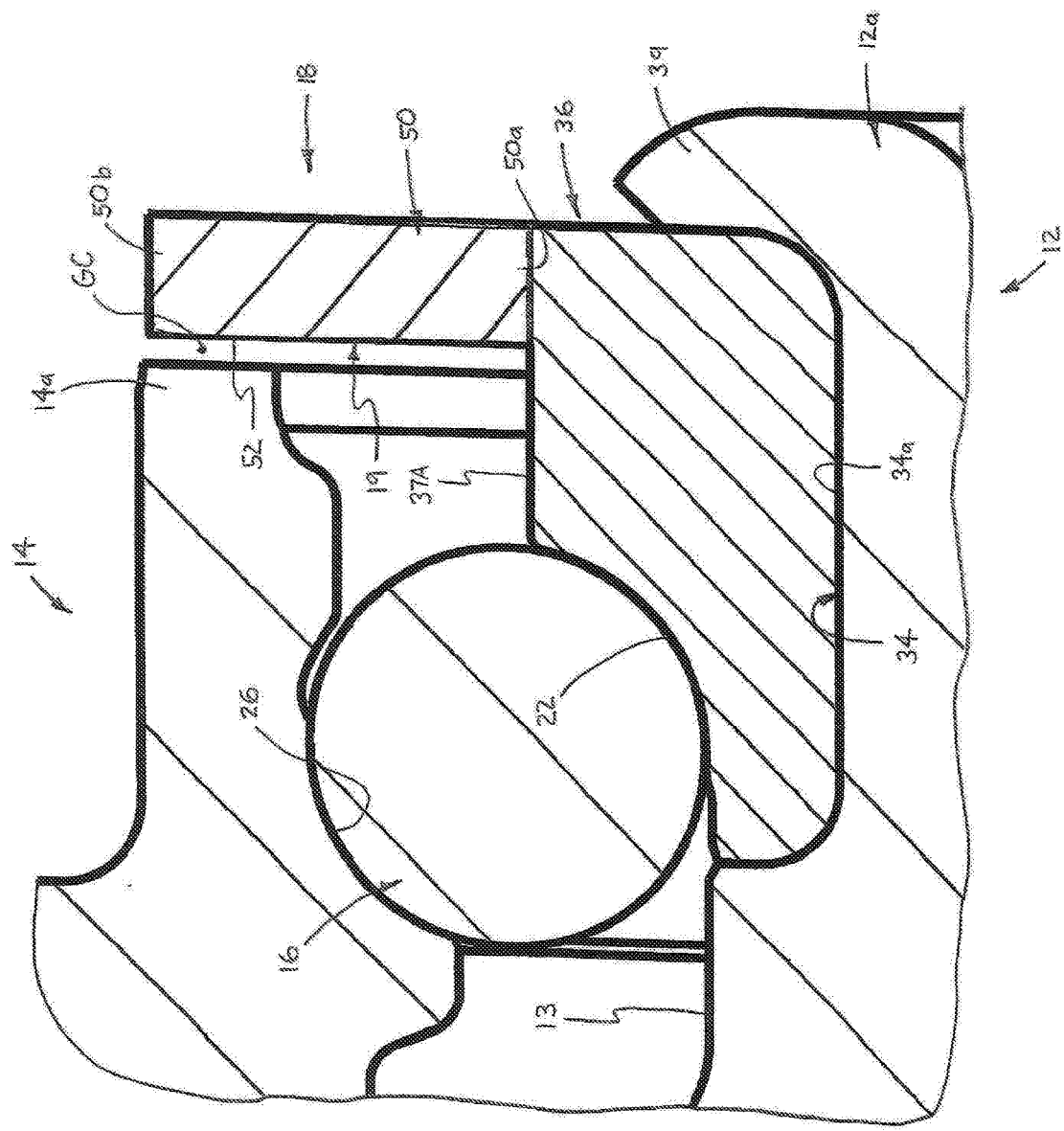
FIG. 8 is an axial cross-sectional view of an alternative construction of the hub bearing unit, showing an axial displacement limiter formed separately from the inner race insert.

Referring particularly to FIG. 5, the annular insert 36 preferably includes a circular cylindrical body 42 with first and second axial ends 42a, 42b and an inner circumferential surface 37B disposed about the groove 34 of the inner ring 12. Preferably, the inner surface 37B is diametrically sized to frictionally engage with the outer surface 34a of the groove 34 so as to form an interference fit between the retainer 36 and the inner ring 12. Further, an annular race groove 44 extends radially inwardly from the outer surface 37A and axially from the first axial end 42a and provides the bearing inner race 22. Also, the circular flange 38 or the flange segments 40 preferably extend(s) radially outwardly from the second axial end 42b of the insert body 42.

Alternatively, as shown in FIG. 7, the displacement limiter 18 may include a separate annular body 50 (i.e., separate from the insert 36) having an inner radial end 50a disposed about the inner ring 12, preferably about the insert outer surface 37A, and an opposing outer radial end 50b. The body outer end 50b is spaced axially from the inboard end 14a of the outer ring 14 and a radial surface 52 extends between the inner and outer ends 50a, 50b and provides the limiter stop surface 19. The separate displacement limiter body 50 is preferably formed at least generally similar to a washer and is preferably frictionally engaged with the inner ring outer surface 13, most preferably the insert outer surface 37A, so as to secure the limiter 18 to the inner ring 12.

Figure 2:
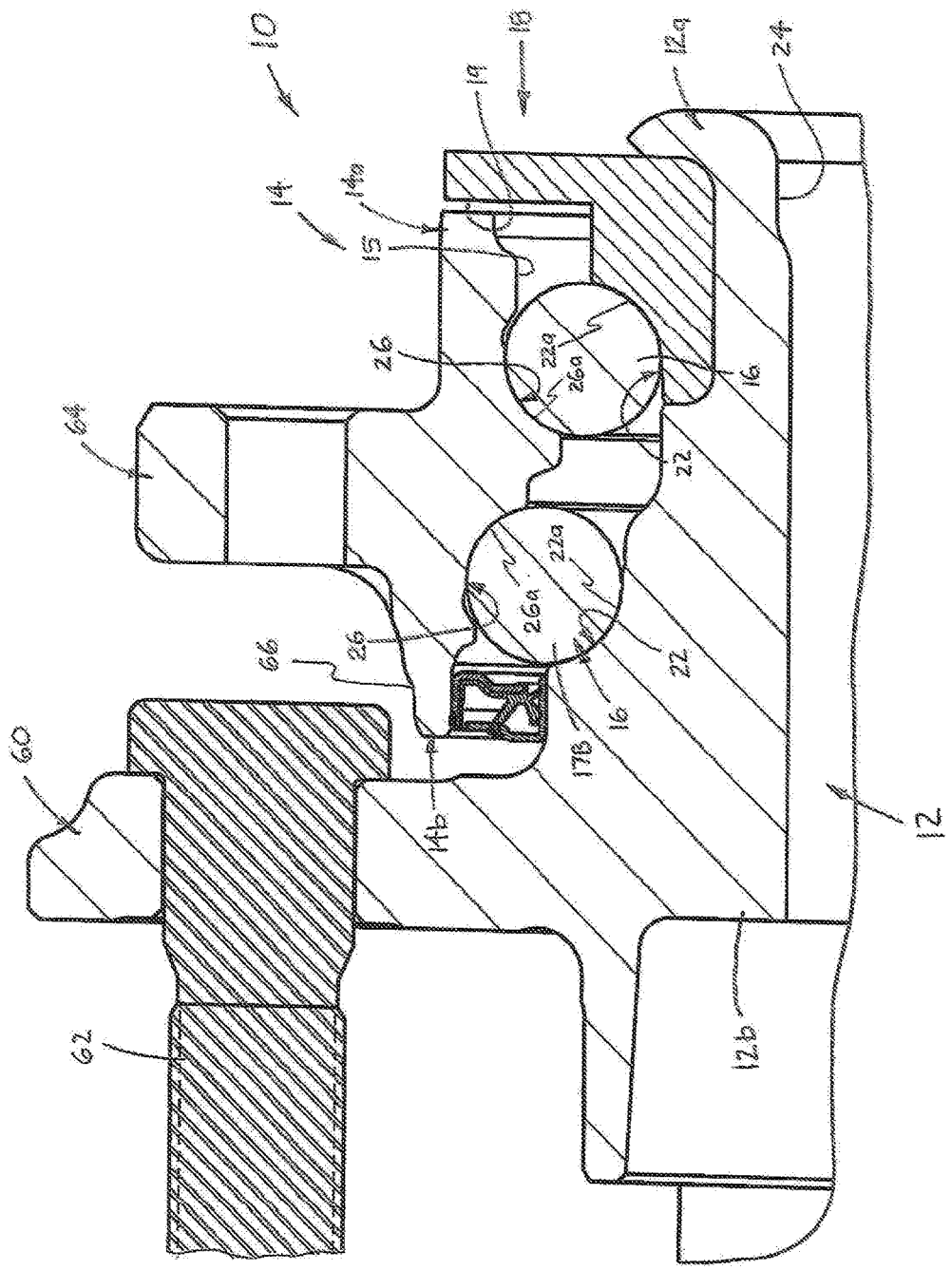
FIG. 2 is an enlarged view of an upper portion of FIG. 1.

Referring to FIGS. 1 and 2, the wheel hub unit 10 is preferably a double row bearing 11 including two sets of inner and outer races and two sets of rolling elements. Specifically, the inner ring 12 has a first, inboard inner race 22 and a second, outboard inner race 22 spaced axially from the first inner race 22. Likewise, the outer ring 14 has a first, inboard outer race 26 and a second, outboard outer race 26 spaced axially from the first outer race 26. Further, a first plurality or row 17A of rolling elements 16 is disposed between and rollable upon the first inner race 22 and the first outer race 26 and a second plurality/row 17B of rolling elements 16 is disposed between and rollable upon the second inner and outer races 22, 26, respectively.

As discussed above, the first, inboard inner race 22 is preferably provided by the insert 36 and the second, outboard inner race 22 is preferably formed directly on the outer surface 13 of the inner ring 12, and both the first and second outer races 26, 26 are preferably formed directly on the inner surface 15 of the outer ring 14. However, the second inner race 22 or either or both of the outer races 26, 26 may alternatively be provided by an appropriate annular insert (none shown) or/and the first inner race 22 may be alternatively directly formed on the outer surface 13 of the inner ring 12. Further, although a double row bearing is preferred, the wheel hub unit 10 may alternatively be formed so as to include only a single row (not shown) of rolling elements 16 for certain applications.

Referring particularly to FIG. 1, in certain presently preferred constructions as depicted, the inner ring 12 is a hub or "flanged inner ring" and includes a flange 60 formed on and extending radially outwardly from the inner ring outboard end 12b. The flange 60 is connectable with a wheel 1, preferably by means of a plurality of bolts 62, to thereby mount the wheel 1 to the wheel hub unit 10. As discussed above, in such a construction, the inner ring 12 is rotatable about the central axis $A_C$ and preferably the central bore 24 receives an end of a rotatable shaft 3 of the vehicle. Also, the outer ring 14 is preferably connected with a steering mechanism or a suspension, preferably through a central flange 64 extending radially outwardly from the outer circumferential surface 66. However, the wheel hub unit 10 may alternatively be formed such that the outer ring 14 functions as a hub and has a flange (not shown) formed on and extending radially outwardly from the outboard end 14b of the ring 14. The flange is connectable with the wheel and the outer ring 14 is rotatable about the central axis $A_C$. In such a construction, the inner ring 12 is preferably mounted on a stub shaft (not shown) connected with a steering mechanism, a suspension and/or a powertrain.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A hub bearing unit for rotatably coupling a wheel with a vehicle frame or powertrain, the hub bearing unit comprising:

an inner ring having an inboard axial end, an outboard axial end, an outer circumferential surface and at least one bearing inner race disposed on the outer surface;

an outer ring disposed about the inner ring and having an inboard axial end, an outboard axial end, an inner circumferential surface and at least one bearing outer race disposed on the inner surface, the inner ring being coupled with the wheel so as to rotate about a central axis and the outer ring being coupled with the vehicle;

a plurality of rolling elements rollable upon the inner and outer races to rotatably couple the inner and outer rings; and a displacement limiter extending radially outwardly from the inner ring outer surface and having a radial stop surface spaced axially from the inboard axial end of the outer ring, the stop surface engaging with the inboard axial end of the outer ring when one of the inner ring and the outer ring displaces axially relative to the other one of the inner ring and the outer ring;

wherein the inner ring has a flange formed on the inner ring outboard end, the flange being connectable with the wheel, the inner ring is rotatable about the central axis and the outer ring is connected with a steering mechanism or a suspension.

2. The hub bearing unit as recited in claim 1 wherein an axial control gap is defined between the stop surface of the limiter and the inboard axial end of the outer ring, the control gap having a predetermined axial length to limit relative axial displacement between the inner and outer rings to the control gap axial length.

3. The hub bearing unit as recited in claim 2 wherein the axial length of the control gap has a value of about 0.3 millimeters or less.

4. The hub bearing unit as recited in claim 1 wherein the inner ring includes an annular groove formed in the outer circumferential surface and an annular insert disposed within the groove and having an outer circumferential surface, the bearing inner race being formed in the insert outer surface and the limiter being spaced axially from the inner race and integrally formed with the insert or disposed about the insert outer surface.

5. The hub bearing unit as recited in claim 4 wherein the displacement limiter is formed as an annular flange extending radially outwardly from the insert outer surface or as a plurality of arcuate flange segments extending radially outwardly from the insert outer surface and spaced circumferentially about the central axis.

6. The hub bearing unit as recited in claim 4 wherein the annular insert includes a circular cylindrical body with a first axial end and a second axial end, an inner circumferential surface disposed about the groove of the inner ring, an opposing outer circumferential surface, an annular groove extending radially inwardly from the outer surface and axially from the first axial end, the groove providing the inner race, and a circular flange extending radially outwardly from the second axial end and providing the limiter.

7. The hub bearing unit as recited in claim 1 wherein the displacement limiter includes one of an annular body and a plurality of arcuate body segments spaced circumferentially about the central axis.

8. The hub bearing unit as recited in claim 1 wherein the displacement limiter includes an annular body having an inner radial end disposed about the inner ring, an outer radial end spaced axially from the inboard end of the outer ring, and a radial surface extending between the inner and outer ends, the radial surface providing the stop surface.

9. The hub bearing unit as recited in claim 1 wherein:

the inner race is a first inner race and the inner ring further has a second inner race spaced axially from the first inner race;

the outer race is a first outer race and the outer ring further has a second outer race spaced axially from the first outer race; and the plurality of rolling elements is a first plurality of rolling elements and the hub bearing unit further comprises a second plurality of rolling elements rollable upon the second inner race and upon the second outer race.

10. A hub bearing unit for rotatably coupling a wheel with a vehicle frame or powertrain, the hub bearing unit comprising:

an inner ring having an inboard axial end, an outboard axial end, an outer circumferential surface and an annular groove extending radially inwardly from the outer surface;

an annular insert disposed within the inner ring groove and providing a bearing inner race;

an outer ring disposed about the inner ring and having an inboard axial end, an outboard axial end, an inner circumferential surface and at least one bearing outer race disposed on the ring inner surface, the inner ring being coupled with the wheel so as to rotate about a central axis and the outer ring being coupled with the vehicle;

a plurality of rolling elements rollable upon the inner and outer races to rotatably couple the inner and outer rings; and a displacement limiter extending radially outwardly from the annular insert and having a radial stop surface spaced axially from the inboard axial end of the outer ring, the stop surface engaging with the inboard axial end of the outer ring when one of the inner ring and the outer ring displaces axially relative to the other one of the inner ring and the outer ring.

11. The hub bearing unit as recited in claim 10 wherein an axial control gap is defined between the stop surface of the limiter and the inboard axial end of the outer ring, the control gap having a predetermined axial length to limit relative axial displacement between the inner and outer rings to the control gap axial length.

12. The hub bearing unit as recited in claim 11 wherein the axial length of the control gap has a value of about 0.3 millimeters or less.

13. The hub bearing unit as recited in claim 10 wherein the displacement limiter is integrally formed with the insert or disposed about an outer surface of the insert.

14. The hub bearing unit as recited in claim 10 wherein the displacement limiter is formed as an annular flange extending radially outwardly from an outer surface of the insert or as a plurality of arcuate flange segments extending radially outwardly from the insert outer surface and spaced circumferentially about the central axis.

15. The hub bearing unit as recited in claim 10 wherein the annular insert includes a circular cylindrical body with a first axial end and a second axial end, an inner circumferential surface disposed about the groove of the inner ring, an opposing outer circumferential surface, an annular groove extending radially inwardly from the outer surface and axially from the first axial end, the groove providing the inner race, and a circular flange extending radially outwardly from the second axial end and providing the limiter.

16. The hub bearing unit as recited in claim 10 wherein the displacement limiter includes an annular body having an inner radial end disposed about the annular insert, an outer radial end spaced axially from the inboard end of the outer ring, and a radial surface extending between the inner and outer and, the radial surface providing the stop surface.

17. The hub bearing unit as recited in claim 10 wherein:

the inner race is a first inner race and the inner ring further has a second inner race spaced axially from the first inner race;

the outer race is a first outer race and the outer ring further has a second outer race spaced axially from the first outer race; and the plurality of rolling elements is a first plurality of rolling elements and the hub bearing unit further comprises a second plurality of rolling elements rollable upon the second inner race and upon the second outer race.

18. The hub bearing unit as recited in claim 10 wherein the inner ring has a flange formed on the inner ring outboard end, the flange being connectable with a wheel, the inner ring is rotatable about central axis and the outer ring is connected with a steering mechanism or a suspension.

19. A hub bearing unit for rotatably coupling a wheel with a vehicle frame or powertrain, the hub bearing unit comprising:

an inner ring having an inboard axial end, an outboard axial end, an outer circumferential surface and an annular groove extending radially inwardly from the outer surface;

an annular insert disposed within the inner ring groove and providing a bearing inner race;

an outer ring disposed about the inner ring and having an inboard axial end, an outboard axial end, an inner circumferential surface and at least one bearing outer race disposed on the inner surface, the inner ring being coupled with the wheel so as to rotate about a central axis and the outer ring being coupled with the vehicle;

a plurality of rolling elements rollable upon the inner and outer races to rotatably couple the inner and outer rings; and a displacement limiter integrally formed with and extending radially outwardly from the annular insert, the limiter having a radial stop surface spaced axially from the inboard axial end of the outer ring, the stop surface engaging the inboard axial end of the outer ring when one of the inner ring and the outer ring displaces axially relative to the other one of the inner ring and the outer ring.

* * * * *